United States Patent
Jayakumar et al.

(10) Patent No.: US 12,250,202 B2
(45) Date of Patent: *Mar. 11, 2025

(54) SECURE AUTHORIZATION AND TRANSMISSION OF DATA BETWEEN TRUSTLESS ACTORS

(71) Applicant: Coinbase, Inc., San Francisco, CA (US)

(72) Inventors: Abhilash Jayakumar, San Francisco, CA (US); Harrison Dahme, San Francisco, CA (US); Nishil Shah, San Francisco, CA (US); Morgan Roman, Kyoto (JP); Zachary Blacher, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,515

(22) Filed: Apr. 26, 2023

(65) Prior Publication Data
US 2023/0269240 A1  Aug. 24, 2023

Related U.S. Application Data

(63) Continuation of application No. 17/462,976, filed on Aug. 31, 2021, now Pat. No. 11,677,728.

(51) Int. Cl.
*H04L 9/40* (2022.01)

(52) U.S. Cl.
CPC ............................. *H04L 63/0442* (2013.01)

(58) Field of Classification Search
CPC . H04L 63/0442; H04L 9/3247; H04L 9/3268; H04L 2463/102; H04L 63/12; H04L 9/50
See application file for complete search history.

(56) References Cited

U.S. PATENT DOCUMENTS

| | | | |
|---|---|---|---|
| 10,282,371 B1 * | 5/2019 | Gaither | G06F 16/1748 |
| 2019/0287175 A1 * | 9/2019 | Hill | G06Q 40/04 |
| 2021/0006410 A1 * | 1/2021 | Uhr | G06Q 20/065 |
| 2021/0099293 A1 * | 4/2021 | Aleksander | H04L 9/3239 |
| 2021/0201344 A1 | 7/2021 | Charron | |
| 2021/0304200 A1 * | 9/2021 | Doney | H04L 9/0825 |

* cited by examiner

*Primary Examiner* — Henry Tsang
(74) *Attorney, Agent, or Firm* — Banner & Witcoff, Ltd.

(57) ABSTRACT

One or more aspects described herein provide methods and systems for authoritatively confirming that a recipient is an intended recipient to receive personal data, and to securely transmit the personal data to the intended recipient, when both the sender and receiver are operating in a trustless ecosystem such as that used with blockchain technology. A computing device may receive an indication of a blockchain address used, by a sender computing device and via a blockchain, to send one or more virtual assets. The computing device may store an association between the blockchain address and the recipient. The computing device may send, to the sender computing device and in response to a query comprising the blockchain address, an indication of the recipient. The indication may be configured to cause the sender computing device to send, to the recipient, personal data associated with an owner of the one or more virtual assets.

20 Claims, 7 Drawing Sheets

{"IVMS101":{"originator":{"originatorPersons":[{"naturalPerson":{"name":{"nameIdentifier":[{"primaryIdentifier":"Post","secondaryIdentifier":"Johnny","nameIdentifierType":"LEGL"}]},"geographicAddress":[{"addressType":"GEOG","streetName":"Potential Street","buildingNumber":"123","buildingName":"Cheese Hut","postcode":"91361","townName":"Thousand Oaks","countrySubDivision":"California","country":"US"}],"customerIdentification":"1002390"}}],"accountNumber":["10023909"]},"beneficiary":{"beneficiaryPersons":[{"naturalPerson":{"name":{"nameIdentifier":[{"primaryIdentifier":"MachuPichu","secondaryIdentifier":"Freddie","nameIdentifierType":"LEGL"}]}}}],"accountNumber":["1BVMFfPXJy2TY1x6wm8gow3N5Amw4Etm5h"]},"originatingVASP":{"legalPerson":{"name":{"nameIdentifier":[{"legalPersonName":"VASP A","legalPersonNameIdentifierType":"LEGL"}]},"nationalIdentification":{"nationIdentifier":"506700T7Z685VUOZL877","nationalIdentifierType":"LEIX"}}}},"extensions":{"deterministicTransfer":{"txId":"1458565368371276312978 66","amount":"10000.00","eventId":"121212"}}}

FIG. 6

SECURE AUTHORIZATION AND TRANSMISSION OF DATA BETWEEN TRUSTLESS ACTORS

CROSS-REFERENCE TO RELATED APPLICATION

This application is a continuation of U.S. patent application Ser. No. 17/462,976, filed Aug. 31, 2021, titled Secure Authorization and Transmission of Data Between Trustless Actors, the content of which are hereby incorporated by reference into the present application.

FIELD

Aspects described herein generally relate to the secure authorization and subsequent transmission of sensitive data between trustless actors over one or more data networks. More particularly, aspects described herein provide techniques for a trustless receiving entity to prove ownership of an otherwise anonymous receiving address associated with a transfer of virtual assets, and for a trustless sending entity to securely send sensitive data to the trustless receiving entity over a data network.

BACKGROUND

Blockchains are a particular type of database software that have been under continuous development and constant improvement since Satoshi Nakamoto first published "Bitcoin: A Peer-to-Peer Electronic Cash System" in 2008. At its essence, a blockchain is a type of database that stores data only after that data is agreed upon by computers linked in a peer-to-peer (P2P) network, and where each "block" of data must be agreed upon before another block of data can be added. Blockchain data is said to be immutable insofar as, once a block is added to the blockchain, it cannot be changed or removed. In addition, blockchain algorithms typically operate based on "trustless" protocols, whereby none of the peers in the P2P network need to be affiliated with or trust each other in order for the block to be agreed upon and added to the Blockchain. To the contrary, it is actually preferable (and perhaps even required) that no single organization or entity controls greater than 50% of the peers on the network, because in such situations a majority actor could take over decision-making within many of the trustless protocols that blockchains use to add data to the blockchain. That majority actor could then add or alter data that might not otherwise be agreed upon by the entities acting reasonably when none of them has majority control. For this reason, blockchains typically may be queried by public APIs (often navigable via blockchain explorer web sites) so that their data can be readily audited, although some blockchains may remain private.

Blockchains can store any kind of data, although at their inception blockchains were primarily used to store digital tokens or cryptocurrency, such as Bitcoin (as used herein, "token" can refer to a cryptocurrency, virtual currency, digital token or any similar construct stored on a blockchain). Cryptocurrencies such as Bitcoin, however, merely use a blockchain as a means to transparently record their payment ledgers. Blockchains can also be used to immutably record any type of data, such as transaction data, votes in an election, product inventories and status, user identifications, deeds to homes, time and location information, and much more. Collectively, such data may be referred to as virtual assets, and such assets can be quite valuable.

In order to store tokens for users, each user can have one or more wallet "addresses" on the blockchain to which tokens can be attributed. Each address is typically the public key of a public/private key pair in an RSA and/or PM infrastructure used by the blockchain. When one user sends some amount of tokens to another user, the sending user's wallet software generates the relevant payment information (sender, receiver, and amount), signs the data using the sending wallet's private key, and submits the transaction to the blockchain for acceptance. Once accepted, the amount of sent tokens become attributed to the receiving wallet rather than the sending wallet in the blockchain's token ledger.

As blockchains have developed, so have their capabilities. Some newer and more sophisticated blockchains allow users to run programs called smart contracts. A smart contract refers to a program that, once deployed, is stored as data on the blockchain itself and cannot be altered. Each smart contract has an associated address on the blockchain, and the source code of the smart contract defines how payments sent to the smart contract address are automatically processed and handled. Because the smart contract is stored on the blockchain itself, the source code for the smart contract can be audited by others to ensure the smart contract operates as intended or advertised. Smart contracts can be thought of as programs that act as self-executing contracts where the terms of the agreement between the buyer and the seller are directly written into lines of code. A user can send tokens directly to a wallet address associated with the smart contract, and the smart contract will execute based on the functions specified in its source code.

For example, a simple smart contract may act as a sort of flight cancellation insurance, where a user pays the smart contract 1% of the fare and receives a 100% refund if the flight is cancelled. In this example, a user may send amount of cryptocurrency to a smart contract address as the purchase fee, along with data identifying a specific airline flight (e.g., airline, flight number, and date). The smart contract records the wallet address from which the "insurance" was purchased, and then monitors the flight status of the requested flight. The smart contract may check publicly accessible APIs providing flight information and, if the flight was canceled, automatically send to the wallet from which the insurance was purchased, a refund in the amount of 100% of the fare (e.g., 100× PurchaseFee). This is just a simple example for illustrative purposes. There are an infinite number of examples of smart contracts, each of varying complexity.

Some blockchains, in addition to general smart contracts, allow users to create individual tokens that can be exchanged on the blockchain. For example, the Ethereum blockchain includes smart contracts that themselves define a new token, separate from Ethereum, that can also be exchanged and tracked on the Ethereum network. These separate tokens' behaviors may be defined by one or more standards on the Ethereum network, the most common of which is referred to as the ERC-20 standard. ERC-20 is the technical standard used for all smart contracts on the Ethereum blockchain for token implementation and provides a list of rules that all Ethereum-based tokens must follow. Today there are over 350,000 different ERC-20 token contracts on the Ethereum blockchain alone. It is therefore infeasible for a human to individually analyze the features of each new token's smart contract, including any inherent security risks it exposes, on Ethereum and other blockchains.

As blockchains and cryptocurrency evolve, so have supporting technologies and companies that provide related services, such as cryptocurrency custodians and exchanges (e.g., Coinbase Inc. of San Francisco, California, among others). A cryptocurrency custodian and/or exchange may generically be referred to as a virtual asset service provider (VASP). As VASPs has begun to provide services similar to traditional banks and/or securities exchanges, government regulation has increased, sometimes requiring VASPs to exchange certain data about customers. For example, the Bank Secrecy Act (BSA) at 31 C.F.R. 103.33(g), often called the "Travel Rule," requires that financial institutions sending money also send, to a recipient financial institution, certain personal information along with the money. In other words, such a rule requires that personally identifying information travel "with" the funds. This rule may apply to some cryptocurrency transactions. That said, based on the nature of underlying blockchain technologies, a user sending some cryptocurrency, tokens, or similar virtual assets from a sending wallet to a receiving wallet address does not automatically know who owns the address they are sending to unless they are provided that address by a known third party. Even then, there is no guarantee that the third party providing the address is the actual owner of that address; the user only knows that a certain third party identified that address. Thus, there is presently no way for VASPs to exchange sensitive information about users without risking that the receiving entity is not the actual owner of the subject address, and may thereafter use the sensitive information for less than honorable purposes.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to techniques, methods, and systems to facilitate the secure exchange of confidential personal data along with a transfer of virtual assets.

A computing device may receive an indication of a blockchain address used, by a sender computing device and via a blockchain, to send one or more virtual assets to a recipient via the blockchain address. The computing device may store an association between the blockchain address and the recipient. The computing device may receive, from the sender computing device, a query comprising the blockchain address. The computing device may identify, in response to the query, the recipient. The computing device may then send, to the sender computing device, an indication of the recipient. The indication of the recipient may be configured to cause the sender computing device to send, to the recipient, personal data associated with an owner of the one or more virtual assets. Such personal data may comprise, for example, one or more of: a legal name of the owner of the one or more virtual assets; or a physical address associated with the owner of the one or more virtual assets. The indication may be further configured to cause the sender computing device to encrypt the personal data using a public key associated with the recipient.

This process may entail use of probabilistic data structures, such as Bloom filters and Cuckoo filters. For example, the computing device may store the association between the blockchain address and the recipient by storing the association between the blockchain address and the recipient in a probabilistic data structure. That probabilistic data structure may be, for example, a Bloom filter or a Cuckoo filter. The computing device may identify the recipient by testing the probabilistic data structure using the blockchain address. Such utilization of a probabilistic data structure might not only be faster than other methods, but might add its own layer of privacy: because some probabilistic data structures are configured such that content might be added but not removed, deleted, and/or otherwise retrieved, the computing device need not actually store blockchain addresses. In this manner, the only way to reconstruct the address ownership records of the computing device may be to reconstruct the whole probabilistic data structure.

The transmissions involved in this process may be encrypted in a variety of ways. For example, the indication of the blockchain address used to send the one or more virtual assets may be encrypted using a private key associated with the recipient. As another example, the personal data may be encrypted, by the sender computing device, using a public key associated with the recipient.

The process described herein may be performed on only certain transfers of virtual assets. For example, the computing device may send the indication of the recipient based on determining that a currency amount of the one or more virtual assets satisfies a regulatory threshold. In such a circumstance, the computing device may store, on a periodic basis, an exchange rate corresponding to a fiat currency value of the one or more virtual assets, and then determine the currency amount of the one or more virtual assets based on the exchange rate.

The association between the blockchain address and the recipient may comprise a proof message. For example, the computing device may store the association between the blockchain address and the recipient by causing the computing device to: generate a universally unique identifier (UUID) corresponding to the blockchain address. The computing device may send the UUID to the recipient. The computing device may receive, from the recipient, a message, signed with a private key associated with the blockchain address, comprising one or more of: the UUID, and the blockchain address. The computing device may then store the message. The computing device may send the indication of the recipient by sending, to the sender computing device, the message.

These and other aspects may be implemented as automated computerized methods, in one or more data processing systems operating substantially autonomously, as computer readable instructions (software) stored on one or more non-transitory computer readable media executable by a data processing system, or in any other statutory subject matter as defined by and interpreted under 35 USC § 101.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

By way of background, recently, due to increasing federal regulation, when a transaction meets predefined criteria, a sender may be required to provide sensitive personal data (e.g., personal identifying information (PII)) to the receiving entity, so that both the sender and receiver can comply with Know Your Customer and/or Anti-Money Laundering (KYC/AML) regulations. This is referred to as the "Travel Rule" by FinCEN (i.e., the United States Department of the Treasury Financial Crimes Enforcement Network), and is defined in 31 C.F.R. §§ 103.33(e) and (f), where personal data (e.g., customer information) must "travel" with transferred asset(s). The Travel Rule rule only applies to a certain subset of transmittals, such as transmittals of funds equal to or greater than three thousand dollars. Generally, the Travel Rule is understood to apply to transfers of virtual assets: specifically, any Virtual Asset Service Provider (VASP) that sends or receives an eligible transaction (e.g., transfers of virtual assets worth equal to or greater than three thousand dollars) to or from another VASP must comply with the Travel Rule by sharing sensitive customer information (e.g., personal data, such as PII) with the receiving VASP. However, based on the underlying blockchain technology, all the sender knows is the address to which one or more virtual assets to be sent. As such, a recipient's blockchain address does not provide sufficient data, standing alone, to allow a recipient to provide personal information to in order to comply with the Travel Rule.

As a general introduction before discussing various elements in more detail below, one or more aspects described herein may provide systems, methods, and techniques for securely and authoritatively confirming that a trustless receiving entity (e.g., a recipient VASP) is entitled to receive sensitive information (e.g., personal data, such as the legal name and/or address of an owner of virtual assets) and subsequently transmitting the sensitive information between from a trustless sending entity (e.g., a sender computing device associated with a sender VASP) to the trustless receiving entity (e.g., the recipient VASP). In the context of the Travel Rule, aspects described herein may provide systems, methods, and techniques for securely and authoritatively allowing a sender computing device to send personal data to a recipient via the blockchain address along with the transfer of one or more virtual assets on the blockchain.

Aspects described herein improve the functioning of computers by improving the security of the transfer of personal data while also improving the manner with which virtual assets are transmitted. The present disclosure relates to virtual assets, such as cryptocurrency, which are inherently computer-implemented. Moreover, aspects detailed herein relate to the manner with which such assets are transferred, particularly in view of the inherent distribution and limitations of blockchain technology. The steps described herein could not be performed by a human being, particularly in view of the virtual nature of the virtual assets transferred, the nature of the computer transmissions involved, and the complex data structures (e.g., probabilistic data structures) involved.

Before these and other improvements are disclosed in more detail, a computing environment with which various aspects of these improvements may be implemented is discussed.

Computing Environment

Figure 1:
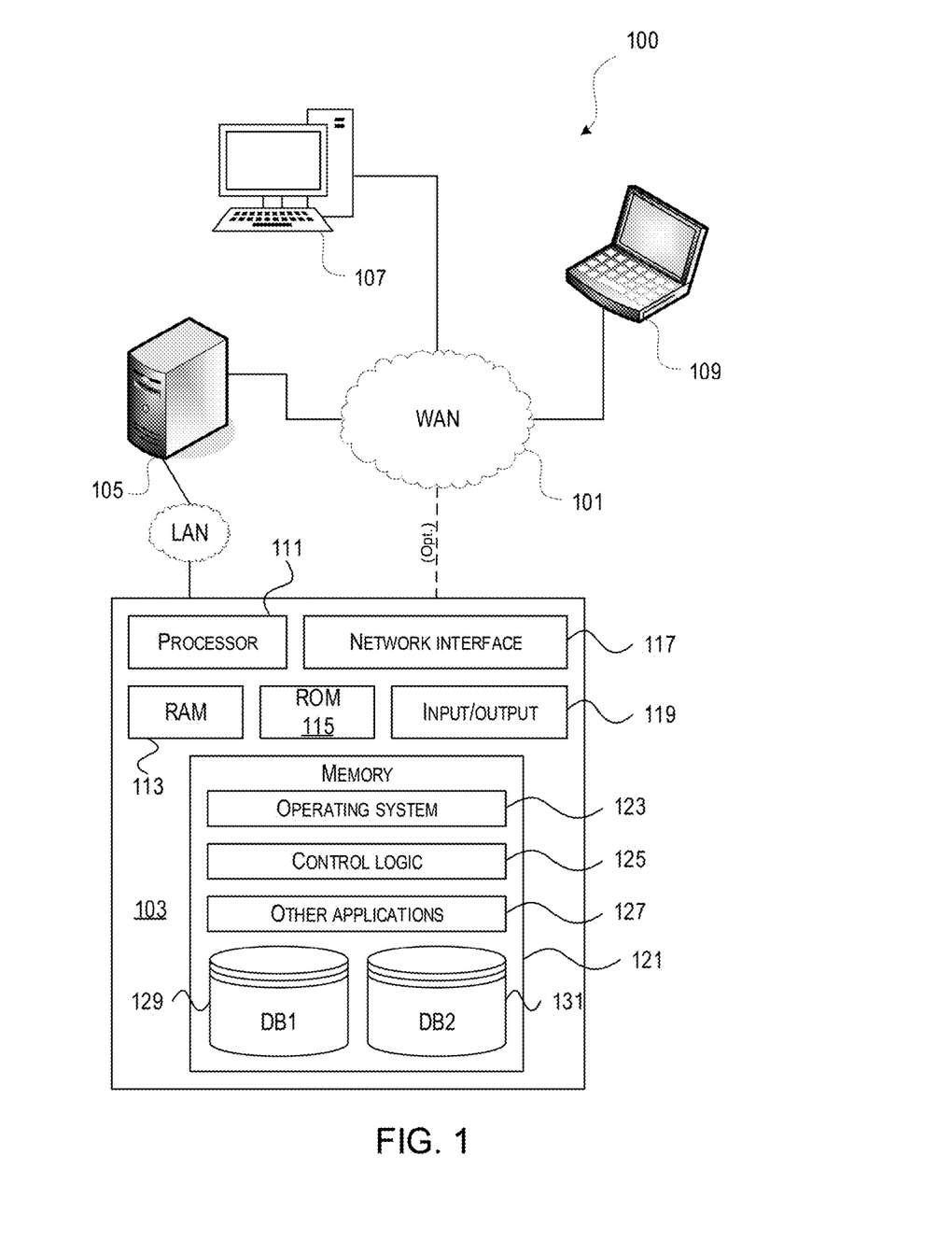
FIG. 1 depicts a network architecture that may be used to implement one or more illustrative aspects described herein.

FIG. 1 illustrates one example of a network architecture 100 that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, second server 105 (e.g., a web server, blockchain node, etc.), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Secure Transfer of Personal Data with Virtual Asset Transfer

Figure 2A:
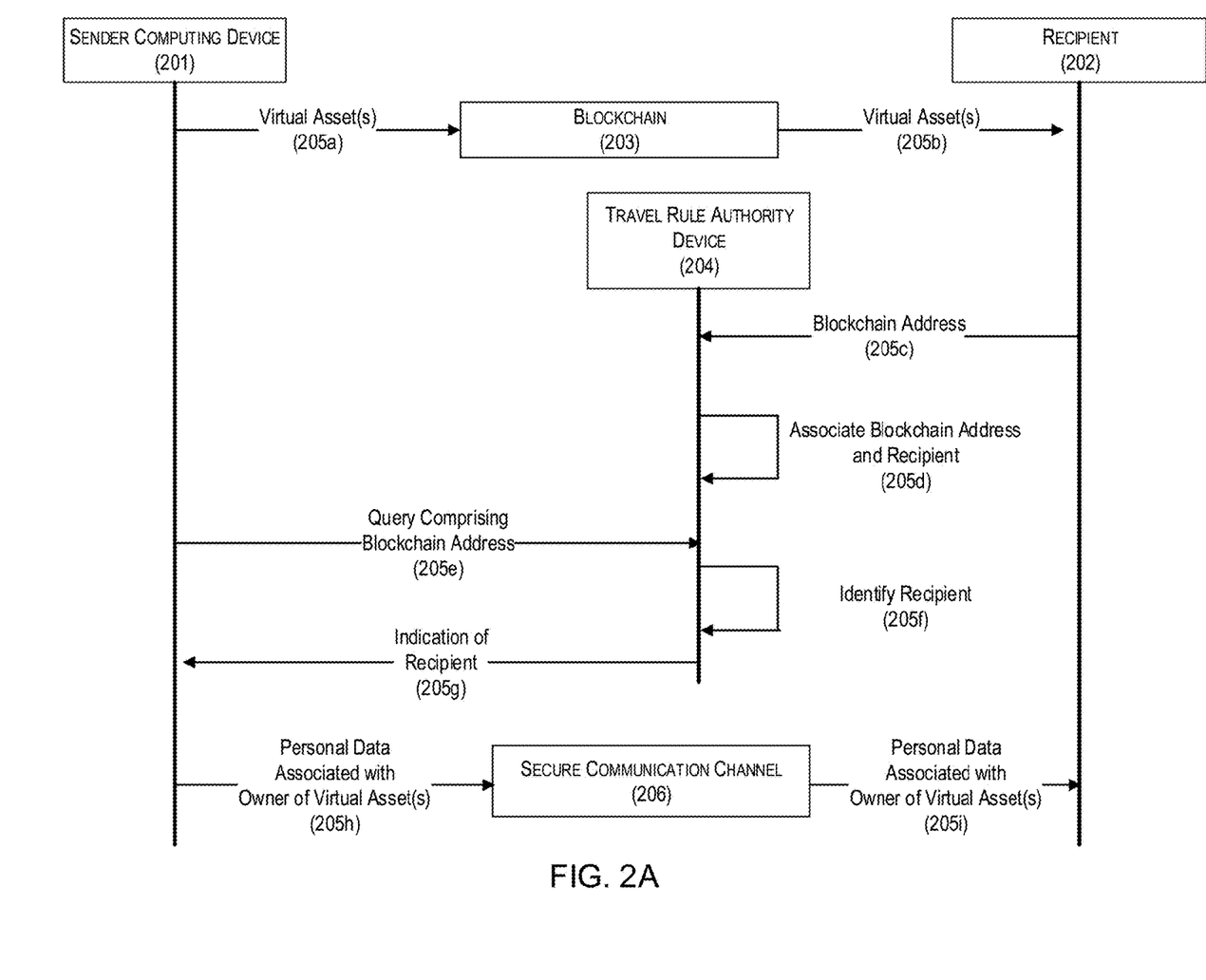
FIG. 2A depicts a messaging diagram between a sender computing device, a recipient, a blockchain, and a Travel Rule authority device, focusing on how the Travel Rule authority device may associate a blockchain address and a recipient.

FIG. 2A depicts a message diagram between a sender computing device 201, a recipient 202, a blockchain 203, and a Travel Rule authority device 204. Each of the sender computing device 201, the recipient 202, and/or the Travel Rule authority device 204 may be one or more computing devices, such as any one of the nodes 103, 105, 107, 109 of FIG. 1. FIG. 2A focuses on a circumstance where the Travel Rule authority device 204 might not already have stored an association between a blockchain address and the recipient 202. Various steps depicted in FIG. 2A may be omitted, re-arranged, or revised as desired.

The sender computing device 201 may be one or more computing devices associated with a VASP. For example, the sender computing device 201 may be associated with a first company that allows users to buy, sell, and trade cryptocurrencies or other virtual assets. The sender computing device 201 may be an endpoint associated with a plurality of different digital wallets and/or accounts which may be associated with various users. For example, the sender computing device 201 may be configured to allow various customers of a first company to buy, sell, and/or transfer cryptocurrencies or other virtual assets. As will be described in more detail below, the sender computing device 201 may be referred to as a "sender" because it may be associated with sending one or more virtual assets to a recipient associated with another VASP.

The recipient 202 may be a VASP that is associated with (e.g., owns, is the custodian of, or otherwise manages) the blockchain address via which virtual assets are received. The recipient 202 may comprise one or more computing devices, such as those similar to the sender computing device 201. The recipient 202 may be associated with a different VASP as compared to the sender computing device 201. For example, whereas the sender computing device 201 may be associated with a first VASP (and may, e.g., send funds on behalf of a first customer), the recipient 202 may be associated with a second VASP (which may, e.g., receive funds on behalf of a second customer).

The blockchain 203 may be any digital and distributed database, or ledger, of transactions, recorded and replicated in real time across a network of computers or nodes, such as those shown in FIG. 1. The blockchain 203 may maintain a ledger of transactions of virtual assets (e.g., cryptocurrency and tokens) from one wallet address to another. Each wallet address may comprise a public key of a public/private key pair in a Rivest-Shamir-Adleman (RSA) and/or Public Key Infrastructure (PM) format. Every transaction recorded in the ledger of the blockchain 203 may be cryptographically validated via a consensus mechanism or protocol executed by the nodes before being permanently added as a new "block" at the end of the "chain" of data. There is no need for a central authority to approve the transaction in the blockchain 203, because the nodes in the network cryptographically confirm accuracy and agree via the consensus protocol before data is added. As such, blockchains, such as the blockchain 203, may be referred to as peer-to-peer trustless systems.

The Travel Rule authority device 204, which may additionally and/or alternatively be referred to as a Travel Rule arbiter, may act as an intermediary between the sender computing device 201 and/or the recipient 202 (e.g., such that it may act as an intermediary between VASPs) to confirm an association between the recipient 202 and an address on the blockchain 203. The Travel Rule authority device 204 may additionally and/or alternatively be configured to initiate a secure transfer of personal data (e.g., PII, such as a legal name and/or address of an owner of transmitted virtual assets) from the sender computing device 201 (e.g., a first VASP) to the recipient 202 (e.g., a second VASP). The Travel Rule authority device 204 may be implemented as a mutually accessible web service, bulletin board, API node, or the like. For example, the Travel Rule authority device 204 may be implemented as any one of the any one of the nodes 103, 105, 107, 109 of FIG. 1. As will be illustrated in greater detail with respect to the steps illustrated in FIG. 2A, the Travel Rule authority device 204 may be configured to balance permissioned and trustless techniques, using a routing layer to determine who (e.g., which recipient/VASP) is associated with (e.g., owns, custodies) a receiving address, and a separate transmission layer (e.g., a secure communications channel) for sharing personal data (e.g., PII) based on the confirmation of ownership/custodianship. The Travel Rule authority device 204 thereby may ensure that only innocuous information (e.g., associations between blockchain addresses and recipients/VASPs) is transmitted and/or stored in the Travel Rule authority device 204, and all sensitive personal data (e.g., PII) may be sent via secure communications channels, such as peer-to-peer requests. The Travel Rule authority device 204 may therefore be responsible for determining which VASP, if any, custodies a blockchain address.

In step 205a and step 205b, the sender computing device 201 may send, via the blockchain 203, one or more virtual assets to the recipient 202. To effectuate this transfer of the one or more virtual assets, the sender computing device 201 may send the one or more virtual assets to a blockchain address. That blockchain address might not be known to be associated with any particular VASP: after all, in some cases, the sender may only know the address itself (e.g., the public key), without knowing the owner of the wallet corresponding to the address or the VASP that may be in custody of the address.

Step 205a may be initiated by a user device (not shown), associated with an owner of the one or more virtual assets, initiating a transfer of those one or more virtual assets to a blockchain address associated with the recipient 202. With that said, as indicated above, the owner (and/or the VASP associated with the sender computing device 201) might not know that the blockchain address is associated with the recipient 202. For example, a user might send one or more tokens to a wallet address without knowing which VASP maintains custody over that wallet address.

In circumstances such as are depicted in FIG. 2A, the transfer of the virtual assets may occur a period of time before personal data is transferred. As such, to comply with applicably KYC/AML regulations, the recipient 202 may hold on to (but not formally deposit or otherwise take permanent possession of) the virtual assets. To that end, while the sender computing device 201 may have already sent the virtual assets to the recipient 202, the VASP receiving the virtual assets may hold those assets in an escrow, a cache, or another similar temporary holding setup until personal data associated with those virtual assets is also received.

In step 205c, the recipient 202 may send, to the Travel Rule authority device 204, a blockchain address. The blockchain address sent to the Travel Rule authority device 204 may be the blockchain address via which the virtual assets were received by the recipient 202 in step 205b. The recipient 202 may be configured to automatically send the blockchain address to the Travel Rule authority device 204 in response to receipt of the virtual assets. For example, the recipient 202 may be configured to automatically transfer a blockchain address to the Travel Rule authority device 204 every time the blockchain address receives any virtual assets.

The blockchain address sent to the Travel Rule authority device 204 may be encrypted. For example, the blockchain address sent to the Travel Rule authority device 204 may be encrypted using a private key associated with the recipient 202. This private key may be a private key corresponding to a public key published in a central repository by the Travel Rule authority device 204. Additionally and/or alternatively, this private key may be a private key that uniquely corresponds to a public/private key pair for the transfer of the virtual assets in step 205a and/or step 205b.

The recipient 202 may send, to the Travel Rule authority device 204, a blockchain address based on determining that a currency amount of the one or more virtual assets satisfies a regulatory threshold. The Travel Rule and other applicable KYC/AML rules might not applicable to all transactions, such that they may apply only to a subset of transactions involving virtual assets. For example, regulations may only apply to transfers of virtual assets worth a threshold amount (e.g., three thousand dollars). In turn, the recipient 202 need not send the blockchain address to the Travel Rule authority device 204 unless the value of the virtual assets equals or exceeds a threshold associated with a regulation. To determine this value, the recipient 202 may be configured to compare a quantity of the one or more virtual assets it received in step 205a and/or step 205b to an exchange rate.

The recipient 202 might be configured to periodically query the travel rule authority device 204 for blockchain addresses stored by the travel rule authority device 204. Such blockchain addresses might, in some circumstances, be stored by the travel rule authority device 204 based on activity on the blockchain 203, such that the travel rule authority device 204 may maintain a list of blockchain addresses for which it does not know a corresponding VASP.

As such, the blockchain address transmitted in step 205c may be responsive to the recipient 202 discovering one of its own blockchain addresses in a database stored by the travel rule authority device 204.

In step 205d, the Travel Rule authority device 204 may associate the blockchain address received in step 205c with the recipient 202. In this manner, the Travel Rule authority device 204 may associate a blockchain address (which might, standing alone, not indicate an origin) with a VASP. The Travel Rule authority device 204 may store the association between the blockchain address and the recipient. For example, the association may be stored in a database which specifies, for one or more VASPs, a list of known blockchain addresses for each VASP.

The Travel Rule authority device 204 might not store associations (e.g., associations between a recipient 202 and a blockchain address) indefinitely, but rather may expire them after a predefined amount of time in order to enhance security and reduce storage burden. In one example, associations may be deleted after thirty days. Other durations of time may be used to balance security, storage, and transaction efficiency/speed.

The association of the blockchain address received in step 205c with the recipient 202 may be stored in a probabilistic data structure, such as a Bloom filter or a Cuckoo filter. A probabilistic data structure may be a space-efficient data structure that may be able to efficiently test whether an element is a member of a set. In this manner, probabilistic data structures are particularly valuable for determining, in a computing resource-efficient manner, whether an element (e.g., a blockchain address) is a member of a set (e.g., a list of blockchain addresses associated with a VASP). Such probabilistic data structures advantageously ensure that, while false positives may be possible in some circumstances, false negatives are not: in other words, a Bloom filter may (if misconfigured and/or otherwise excessively large) incorrectly output that a blockchain address is associated with a VASP, but will not incorrectly output that a blockchain address is not associated with a VASP. This sort of reliability may be useful where, as here, the risk of a false positive may be somewhat low: at worst, the receiving VASP (e.g., the VASP associated with the recipient 202) may receive personal data that they do not need and can safely discard.

A plurality of probabilistic data structures may be maintained such that, e.g., each probabilistic data structure of a plurality of different probabilistic data structures may correspond to a different VASP of a plurality of different VASPs. In this circumstance, the Travel Rule authority device 204 may associate the blockchain address received in step 205c with the recipient 202 by testing various probabilistic data structures associated with different VASPs until a "true" value is output based on the testing.

Because the likelihood of false positives with some forms of probabilistic data structures increase with the size of (e.g., the number of elements in) the probabilistic data structure, and because elements cannot (in some cases) be removed from some forms of probabilistic data structures (e.g., Bloom filters), the Travel Rule authority device 204 may be configured to periodically delete and re-create probabilistic data structures. For example, the Travel Rule authority device 204 may re-create the probabilistic data structure corresponding to each VASP on a yearly basis. In this manner, dead, transferred (e.g., to another VASP), otherwise no-longer-applicable addresses may be removed from the probabilistic data structure. While this deletion may mean that the recipient 202 is forced to re-affirm custodianship of a particular blockchain address, this additional process (e.g., repeating one or both of step 205c and/or step 205d for the same blockchain address every year) may nonetheless be worthwhile in terms of reducing the possibility of false positives.

One advantage of a probabilistic data structure is that, because of the way they are configured, new elements may be added (such that the probabilistic data structure might test for more elements), but those elements generally cannot be removed, analyzed, or otherwise retrieved. This provides a layer of security: the Travel Rule authority device 204 need never store, in plaintext, blockchain addresses or other sensitive information. As such, even if a probabilistic data structure were acquired by a malicious entity, that malicious entity would not be able to reverse engineer the probabilistic data structure to identify blockchain addresses corresponding to one or more VASPs.

The process depicted in step 205c and 205d may entail use of proof messages. A proof message may comprise a message, from the recipient 202, that proves that the recipient 202 is associated with the blockchain address. Such proof messages may operate to avoid man-in-the-middle attacks or other forms of falsification in the system which may result in the inadvertent disclosure of personal information. Based on receiving the blockchain address in step 205c, the Travel Rule authority device 204 may generate a universally unique identifier (UUID) corresponding to the blockchain address. This UUID, which may additionally and/or alternatively be referred to as a globally unique identifier (GUID), may comprise a 128-bit series of characters that unique correspond to the blockchain address. The UUID may be generated by the Travel Rule authority device 204 using an algorithm and/or standard that ensures that the UUID is unique to the blockchain address. The Travel Rule authority device 204 may send the UUID to the recipient 202. Then, the recipient 202 may create a message that comprises the UUID and the blockchain address. That message may be signed with a private key associated with the blockchain address. The recipient 202 may send, to the Travel Rule authority device 204, the signed message. The Travel Rule authority device 204 may store the signed message and/or may add an indication, to a probabilistic data structure, that the proof message was received. In this way, because the recipient 202 signs the message with the private key associated with the blockchain address, the signed message may prove that the VASP associated with the recipient 202 is genuinely associated with the blockchain address.

In circumstances where probabilistic data structures are implemented by the Travel Rule authority device 204, such probabilistic data structures might be used to test whether proof messages are stored (e.g., by the Travel Rule authority device 204). For example, the Travel Rule authority device 204 may test a probabilistic data structure using a blockchain address to detect whether it has received and stored a proof message. If the probabilistic data structure returns a value of true, then the Travel Rule authority device 204 may search for the proof message on its storage device(s).

In step 205e, the sender computing device 201 may send, to the Travel Rule authority device 204, a query comprising the blockchain address. The query need not be in any particular format, and may be configured to indicate, to the Travel Rule authority device 204, that the sender computing device 201 is requesting an identity of a VASP associated with the blockchain address. The blockchain address in the query may be hashed and/or otherwise processed as desired. For example, for storage efficiency and/or privacy, some or all of the blockchain addresses stored by the Travel Rule authority device 204 may be hashed. In such a circumstance, the sender computing device 201 may query the Travel Rule authority device 204 for a blockchain address by hashing the blockchain address in its query.

The sender computing device 201 may wait a period of time, such as five minutes, before sending the query in step 205e. In various examples, the sender computing device 201 may wait m minutes (e.g., m=5), may wait for c confirmations of the sending blockchain transaction (e.g., c=3), and/or may wait for b blocks to be added to the blockchain (e.g., b=10), or any other desired metric, before making a second query. That delay may account for the time for the virtual assets to be ultimately received by the recipient 202, as well as any transmission and processing delays corresponding to step 205c and step 205d.

In step 205f, the Travel Rule authority device 204 may identify the recipient 202. The Travel Rule authority device 204 may identify the recipient 202 based on the association in step 205d. For example, if the computing device stored the association between the blockchain address and the recipient in a database, then step 205f may comprise querying the database with the blockchain address to determine a VASP corresponding to the blockchain address. Additionally and/or alternatively, if associations between blockchain addresses and the recipient 202 are stored in a probabilistic data structure (e.g., a Bloom filter or a Cuckoo filter), the Travel Rule authority device 204 may identify the recipient 202 by testing the probabilistic data structure using the blockchain address. Additionally and/or alternatively, if associations between blockchain addresses and stored proof messages corresponding to the recipient 202 are stored in a probabilistic data structure (e.g., a Bloom filter or a Cuckoo filter), the Travel Rule authority device 204 may identify the recipient 202 by testing the probabilistic data structure using the blockchain address, determining, based on the testing, that a proof message corresponding to a particular VASP is stored, and retrieving the stored proof message.

In step 205g, the Travel Rule authority device may send, to the sender computing device 201, an indication of the recipient 202. The indication of the recipient 202 may comprise an indication of a VASP associated with the blockchain address. The indication of the recipient may be anything from a name of the VASP (e.g., a legal name associated with the VASP), an Internet Protocol (IP) address and/or website associated with a public-facing computing device of the VASP, or the like.

The Travel Rule authority device 204 may be configured to determine whether a transaction is subject to KYC/AML rules, such that it need not send the indication of the recipient 202 unless the transaction in question is subject to KYC/AML rules. The recipient 202 may send (e.g., as part of step 205c), to the Travel Rule authority device 204, a blockchain address and an indication of the virtual assets (e.g., a quantity of cryptocurrency received by the recipient 202). The Travel Rule authority device 204 may store, on a periodic basis, an exchange rate corresponding to a fiat currency value of the one or more virtual assets. For example, the Travel Rule authority device 204 may store, on a daily basis, an exchange rate that correlates a value of a cryptocurrency with a value of the United States dollar. The Travel Rule authority device 204 may determine the currency amount of the one or more virtual assets based on the exchange rate. For example, the Travel Rule authority device 204 may multiply the quantity of the cryptocurrency received by the recipient 202 by the exchange rate. Then, the Travel Rule authority device 204 may be configured to transmit the indication of the recipient based on determining that the currency amount of the one or more virtual assets satisfies a regulatory threshold.

If the recipient 202 has sent a proof message to the Travel Rule authority device 204, sending the indication of the recipient 202 to the sender computing device 201 may comprise sending the proof message to the sender computing device 201. The sender computing device 201 may be able to use this proof message to determine that the recipient 202 is genuinely associated with the blockchain address. For example, the sender computing device itself may determine the UUID generated by the Travel Rule authority device 204, then create a second message comprising the UUID and the blockchain address, then (e.g., using a public key associated with the blockchain address) verify a signature of the second message. In this manner, the sender computing device 201 is able to use its own knowledge of the blockchain address to validate that a VASP is associated with a particular blockchain address, and the Travel Rule authority device 204 may merely act as an intermediary for this process.

In some cases, the Travel Rule authority device 204 may be configured to never store or otherwise have access to blockchain addresses. For example, the proof messages described above might be encrypted and/or otherwise configured such that the Travel Rule authority device 204 does not have access to blockchain addresses. In this implementation, slightly less computationally efficient storage and query process might be used, albeit in a manner which protects the privacy of the sender computing device 201 and the recipient 202. To effectuate such an implementation, the proof messages might be encrypted and/or otherwise obfuscated. For example, as part of step 205c, the recipient might provide the Travel Rule authority device 204 with a proof message for a particular VASP, but need not indicate the blockchain address to which the proof message corresponds. In such a circumstance, step 205d might be skipped. Then, in step 205e, the sender computing device 201 might query the Travel Rule authority device 204 in a manner which permits it to locate and identify the proof message without use of the blockchain address. For example, the query might ask the Travel Rule authority devices for all proof messages provided in the last five minutes. Then, in step 205f, the Travel Rule authority device 204 might identify one or more proof messages using that query, then send the proof messages to the sender computing device 201 in step 205g.

In step 205h and step 205i, the sender computing device 201 may send, to the recipient 202 and via a secure communication channel 206, personal data associated with an owner of the virtual assets transmitted in step 205a and step 205b. Once the sender computing device 201 has received an indication of the recipient 202 (e.g., an identity of the VASP), the sender computing device 201 may transmit personal data to the recipient 202. The personal data may comprise a legal name of an owner of the transmitted virtual assets, a physical address of the owner of the transmitted virtual assets, or any other similar information which may identify the owner of the transmitted virtual assets in compliance with applicable regulations.

The indication of the recipient 202 sent to the sender computing device 201 in step 205g may be configured to cause the sender computing device 201 to send the personal data in step 205h. The indication may additionally and/or alternatively be configured to cause the sender computing device 201 to encrypt the personal data using a public key associated with the recipient. In this manner, the indication may automatically cause activity by the sender computing device 201, so as to ensure that a VASP associated with the sender computing device 201 is quickly and reliably compliant with applicable regulations.

The secure communication channel 206 may be any encrypted and/or otherwise secure method with which personal data may be transmitted. The secure communication channel 206 may be peer-to-peer, such that the sender computing device 201 directly (e.g., without intervention of the Travel Rule authority device 204) sends personal data to the recipient 202. In this manner, the secure communication channel 206 may operate such that the Travel Rule authority device 204 need not store personal information of any individual. The secure communication channel 206 may transmit data in accordance with a transfer protocol. The transfer protocol may encompass a set of standards that VASPs (e.g., a VASP associated with the sender computing device 201 and the VASP corresponding to the recipient 202) have agreed to. In this manner, sensitive personal data may be transmitted using multiple layers of encryption.

As one example of a layer of encryption, each VASP may implement a client and server certificate usable for establishing Mutual Transport Layer Security (mTLS) connections between VASPs. For example, prior to sending the personal data, the sender computing device 201 may establish the secure communication channel by instantiating an mTLS connection with the recipient 202. The mTLS connections might be advantageous to implement between VASPs because, for instance, both client and server (e.g., both VASPs) provide identity information (e.g., certificates) to authenticate one another. As such, the mutual authentication in mTLS is different from the authentication in Transport Layer Security (TLS), where only the server provides its certificate (and/or similar identity) to a client. As part of this mTLS process, only certain certificates might be considered appropriate by VASPs. For example, domain-validated certificates might not be allowed as part of the mTLS process described herein because such certificates only require the buyer to demonstrate control of a domain or Uniform Resource Locator (URL). In contrast, organization validated (OV) and extended validation (EV) certificates might be allowed, as such certificates require significantly more detail for the purposes of verification. Additional approaches might be taken to further strengthen certificates used for the mTLS process. For example, only certain root certificate authorities (CAs) might be permitted. As another example, certificates might be required to be issued from a static and/or otherwise consistent subdomain. As another example, Online Certificate Status Protocol (OCSP) stapling may be used to check the revocation of certificates. As another example, certificate transparency (CT) monitoring may be implemented. As yet another example, VASPs might publicly define (e.g., in a public database shared amongst other VASPs) a set of Internet Protocol (IP) addresses from which the VASP will connect for the purposes of conducting the secure communication channel 206 such that, should another IP address be used to initiate such a connection, it might be inferred that security may have been compromised.

As an example of another layer of encryption, each VASP may use a public/private key pair to coordinate secure authorizations and transfer, and public keys for those VASPs may be stored in a central repository so that counterparties can make a reasonable assumption that the public key they're using for another VASP is authentic. For example, when a first VASP (e.g., corresponding to the sender computing device 201) plans to send personal data to a second VASP (e.g., corresponding to the recipient 202), the first VASP may look up (e.g., in a central repository) the second VASP's public key, encrypt the data using the second VASP's public key, then send the encrypted data to the second VASP via an mTLS connection. The second VASP may then use its corresponding private key to decrypt the data.

One significant advantage of the process described above is that the Travel Rule authority device 204 need never store (or, indeed, even process) personally identifiable information. As indicated by FIG. 2A, the Travel Rule authority device 204 may handle information such as blockchain addresses, but need not ever have access to any personally identifiable information. Instead, personally identifiable information may be exchanged via the secure communication channel 206 and directly between the sender computing device 201 and the recipient 202. In this manner, customer privacy is maintained.

Another significant advantage of the process described above is that malicious users cannot try to extract, from the Travel Rule authority device 204, correlations between VASPs, customers, and/or blockchain addresses. Because the Travel Rule authority device 204 need not store or even process personally identifiable information, even if the Travel Rule authority device 204 is compromised, it cannot provide personally identifiable information to malicious actors. Moreover, because the Travel Rule authority device 204 may store associations between blockchain addresses and VASPs for a short period of time (e.g., a few minutes), malicious access to the Travel Rule authority device 204 may provide only a limited window to access correlations between blockchain addresses and VASPs. Additionally, the Travel Rule authority device 204 may be private and only accessible to VASPs, such that only trusted users may access the Travel Rule authority device 204 in the first place.

Discussion will now turn to another circumstance in which the Travel Rule authority device 204 may advantageously enhance VASP compliance with applicable regulations, such as the Travel Rule.

Figure 2B:
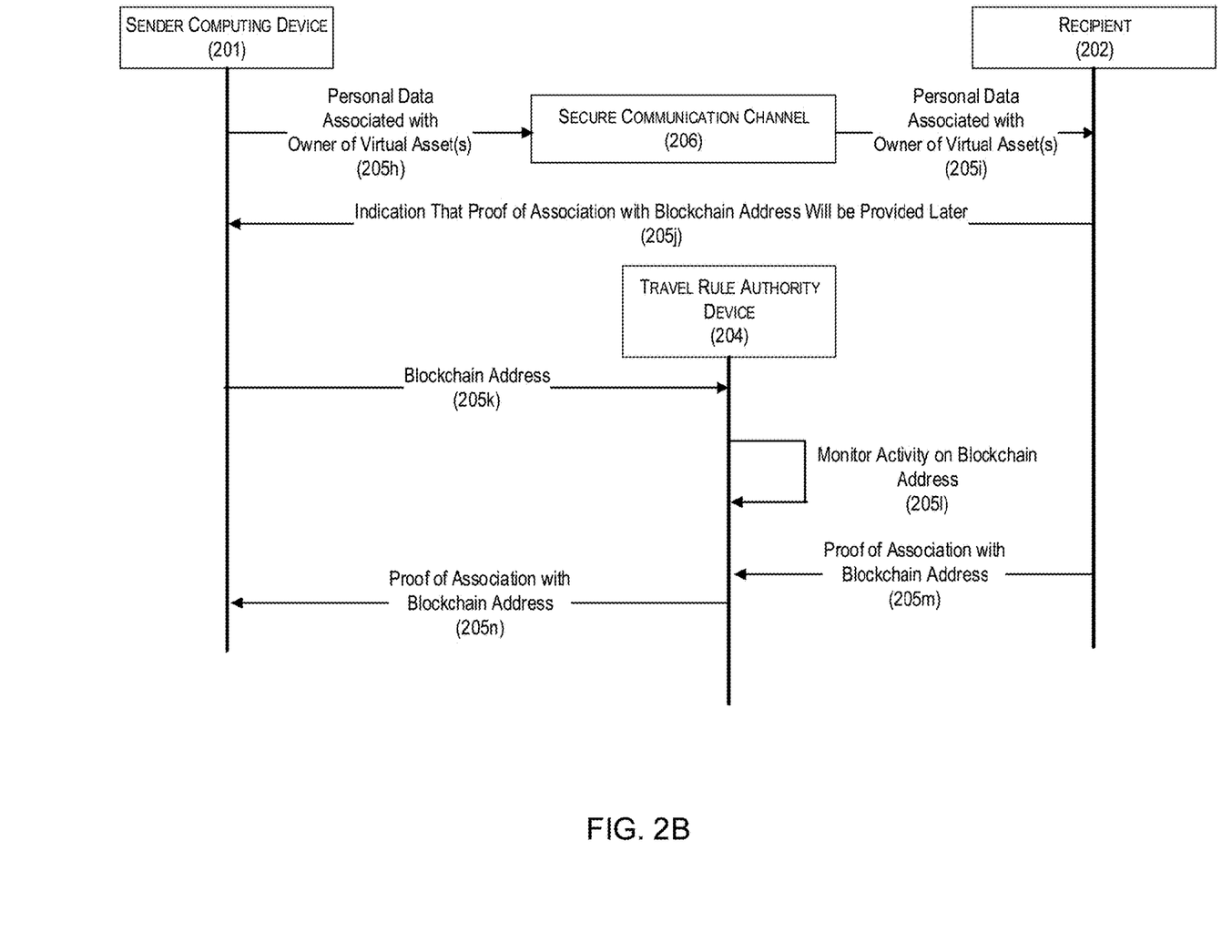
FIG. 2B depicts a second messaging diagram between a sender computing device, a recipient, a blockchain, and a Travel Rule authority device, focusing on a scenario where a recipient provides a proof-of-address for a future transaction.

FIG. 2B depicts a second message diagram between the sender computing device 201, the recipient 202, the Travel Rule authority device 204. As with FIG. 2B, each of the sender computing device 201, the recipient 202, and/or the Travel Rule authority device 204 may be one or more computing devices, such as any one of the nodes 103, 105, 107, 109 of FIG. 1. FIG. 2B focuses on a circumstance where the Travel Rule authority device 204 facilitates a sender computing device 201 proactively transmitting personal data to a recipient 202 in exchange for a promise (an "IOU") for proof of association with a blockchain address at a later date. A computing device may comprise one or more processors and memory storing instructions that, when executed by the one or more processors, cause the performance of one or more steps of FIG. 2B. Moreover, one or more non-transitory computer-readable media may store instructions that, when executed by one or more processors, cause a computing device to perform one or more of the steps of FIG. 2B. The various steps depicted in FIG. 2B may be omitted, re-arranged, or revised as desired.

In FIG. 2B, step 205h and step 205i are reproduced from FIG. 2A, except those steps are being shown as starting the message diagram. In this example, for the purposes of illustration, step 205h and step 205i have been performed whether or not the sender computing device 201 has sent one or more virtual assets to the recipient 202 via the blockchain 203. Moreover, in this illustrative example, the sender computing device 201 has performed these steps without being given proof that the recipient 202 is, in fact, genuinely associated with the blockchain address. As such, FIG. 2B reflects a circumstance where the sender computing device 201 has proactively provided the recipient 202 with personal data without necessarily validating that the recipient 202 is genuinely associated with the blockchain address.

In this manner, FIG. 2B reflects a scenario whereby a sender VASP trusts a recipient VASP to prove that it is associated with a blockchain address at a later time. This sort of approach may be taken between well-known, public VASPs, where the speed of personal data exchange may take priority (albeit temporarily) over the continual validation of blockchain address associations. Additionally and/or alternatively, such an approach may be taken for efficiency: for example, a sender VASP may verify blockchain address associations in batches for entire time periods, rather than making such verifications on a transaction-by-transaction basis. That said, the process depicted in FIG. 2B might not be performed where, for example, a VASP is untrusted or otherwise unknown, as this form of trust may be a source of weakness for potential malicious activity (e.g., man-in-the-middle attacks, attempts to gain access to personal data, or the like).

In step 205*j*, the recipient 202 sends, to the sender computing device 201, an indication that a proof (e.g., that the recipient 202 is associated with a blockchain address) will be provided at a later time. This transmission may, in effect, be a sort of promise from a first VASP (e.g., associated with the recipient 202) to a second VASP (e.g., one associated with the sender computing device 201) that the second VASP should (temporarily) take the first VASP at its word that it is associated with a particular blockchain address. As suggested above, such a transmission may be made in circumstances where network conditions (e.g., blockchain conditions, a level of use of the Travel Rule authority device 204) make quick and/or reliable proof of association with blockchain addresses undesirably slow.

In step 205*k*, the sender computing device 201 may send, to the Travel Rule authority device 204, the blockchain address. The blockchain address sent in step 205*k* may be associated with a past transaction. In this manner, the sender computing device 201 informs the Travel Rule authority device 204 that it needs a proof of association for the blockchain address, such that it can vouchsafe that the personal data transmitted in step 205*h* was transmitted to the correct VASP. This step may be the same or similar as step 205*e* of FIG. 2A.

In step 205*l*, the Travel Rule authority device 204 may monitor activity on a blockchain, such as the blockchain 203. This step may be performed where, for example, the indication received by the sender computing device 201, in effect, promises that the recipient 202 will send a proof of association during some later blockchain transaction. For example, the indication sent in step 205*j* may indicate that, because of processing delays or similar limitations, the recipient 202 will send a proof of association after a certain number of blocks have been added to the blockchain 203, and/or during a later transaction between the sender computing device 201 and the recipient 202. In this manner, the Travel Rule authority device 204 may wait for such conditions to arise, thereby waiting for a triggering event after which the recipient 202 is obligated to send a proof of association to the sender computing device 201 via the Travel Rule authority device 204.

In step 205*m*, at some point (e.g., a triggering event, such as subsequent transaction on the blockchain 203 between the sender computing device 201 and the recipient 202), the recipient 202 may send a proof of association to the Travel Rule authority device 204. This step may be the same or similar as step 205*c* and/or step 205*d* of FIG. 2A. Then, in step 205*n*, the proof of association may be sent from the Travel Rule authority device 204 to the sender computing device 201. This step may be the same or similar as step 205*f* and/or step 205*g* of FIG. 2A.

Discussion will now briefly turn to an example of a rearranged form of FIG. 2A, reflecting a circumstance where the Travel Rule authority device 204 has already determined an association between the recipient 202 and a blockchain address.

Figure 2C:
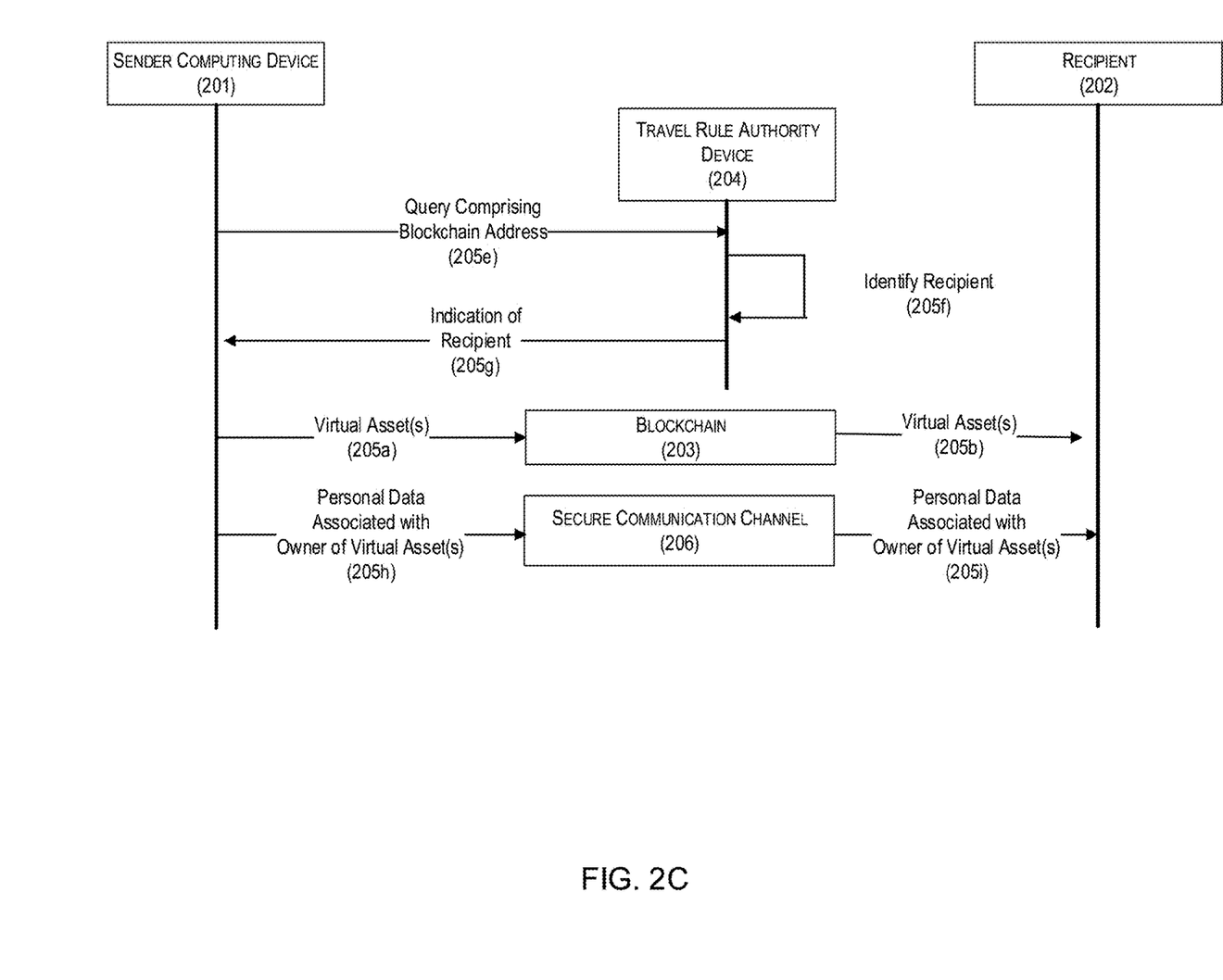
FIG. 2C depicts a third messaging diagram between a sender computing device, a recipient, a blockchain, and a Travel Rule authority device, focusing on circumstances where the Travel Rule authority device has already associated a recipient and a blockchain address.

FIG. 2C depicts a third message diagram between the sender computing device 201, the recipient 202, the blockchain 203, and the Travel Rule authority device 204. As with FIG. 2A and FIG. 2B, each of the sender computing device 201, the recipient 202, and/or the Travel Rule authority device 204 may be one or more computing devices, such as any one of the nodes 103, 105, 107, 109 of FIG. 1. FIG. 2C focuses on a circumstance where the Travel Rule authority device 204 has already stored an association between the recipient 202 and a blockchain address. A computing device may comprise one or more processors and memory storing instructions that, when executed by the one or more processors, cause the performance of one or more steps of FIG. 2C. Moreover, one or more non-transitory computer-readable media may store instructions that, when executed by one or more processors, cause a computing device to perform one or more of the steps of FIG. 2C. The various steps depicted in FIG. 2C may be omitted, re-arranged, or revised as desired.

More particularly, FIG. 2C depicts many of the same steps as FIG. 2A, except that many steps have been re-arranged and omitted in view of the fact that the Travel Rule authority device 204 may already store information associating the recipient 202 with a particular blockchain address. In this circumstance, in step 205*e*, the sender computing device 201 may be able to proactively query the Travel Rule authority device 204 to determine a VASP associated with a blockchain address to which it plans to send one or more virtual assets. In step 205*f*, the Travel Rule authority device 204 may identify the recipient 202 as associated with the blockchain address included in the query in step 205*e*. Then, in step 205*g*, the Travel Rule authority device 204 may send an indication of the recipient 202 to the sender computing device 201. The sender computing device 201 may then send both the virtual assets and the personal data to the recipient 202 at the same time. Specifically, in step 205*a* and step 205*b* (which are now after step 205*g*), the sender computing device 201 may send, via the blockchain 203, the virtual assets to the recipient 202. At or around the same time, in steps 205*h* and 205*i*, the sender computing device 201 may send, via the secure communication channel 206, the personal data associated with an owner of the virtual asset(s).

The message diagram depicted in FIG. 2C may be implemented where, for example, VASPs share (e.g., inter-report) blockchain addresses to which they are associated. For example, a plurality of trusted VASPs may periodically share blockchain addresses with one another and/or with the Travel Rule authority device 204 in order to expedite the transmittal of personal data in compliance with applicable regulations. For example, the Travel Rule authority device 204 might periodically receive, from different VASPs, listings of blockchain addresses to which they claim ownership. The Travel Rule authority device might validate these claims (e.g., through requiring proof messages) and then may generate a probabilistic data structure based on the validated blockchain addresses.

Figure 3:
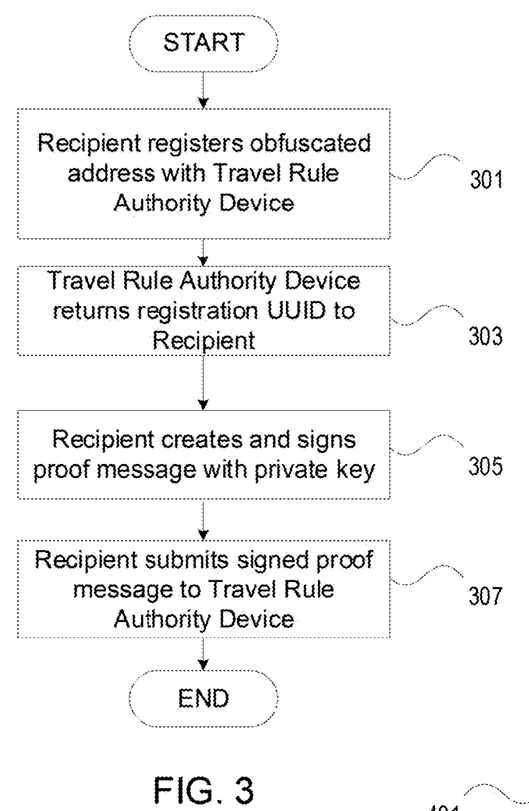
FIG. 3 is a flow chart depicting steps which may be performed to create a signed proof message.
Figure 4:
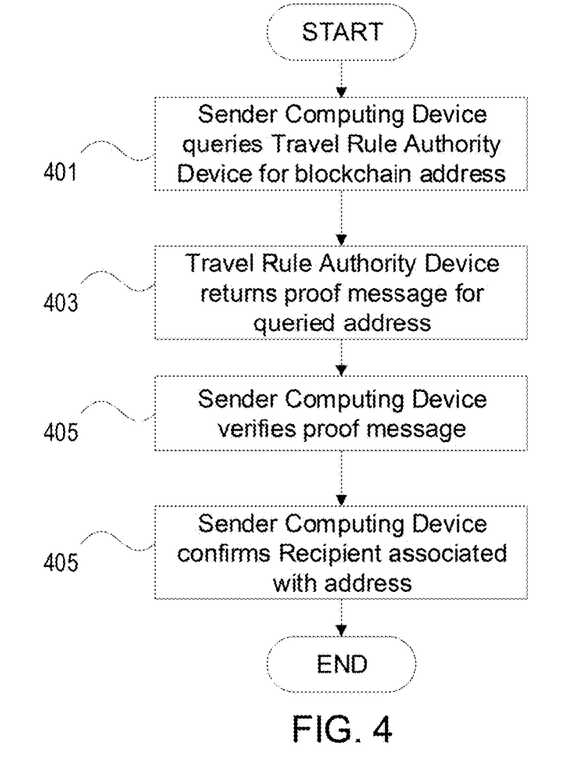
FIG. 4 is a flow chart depicting steps which may be performed to verify a proof message.
Figure 5:
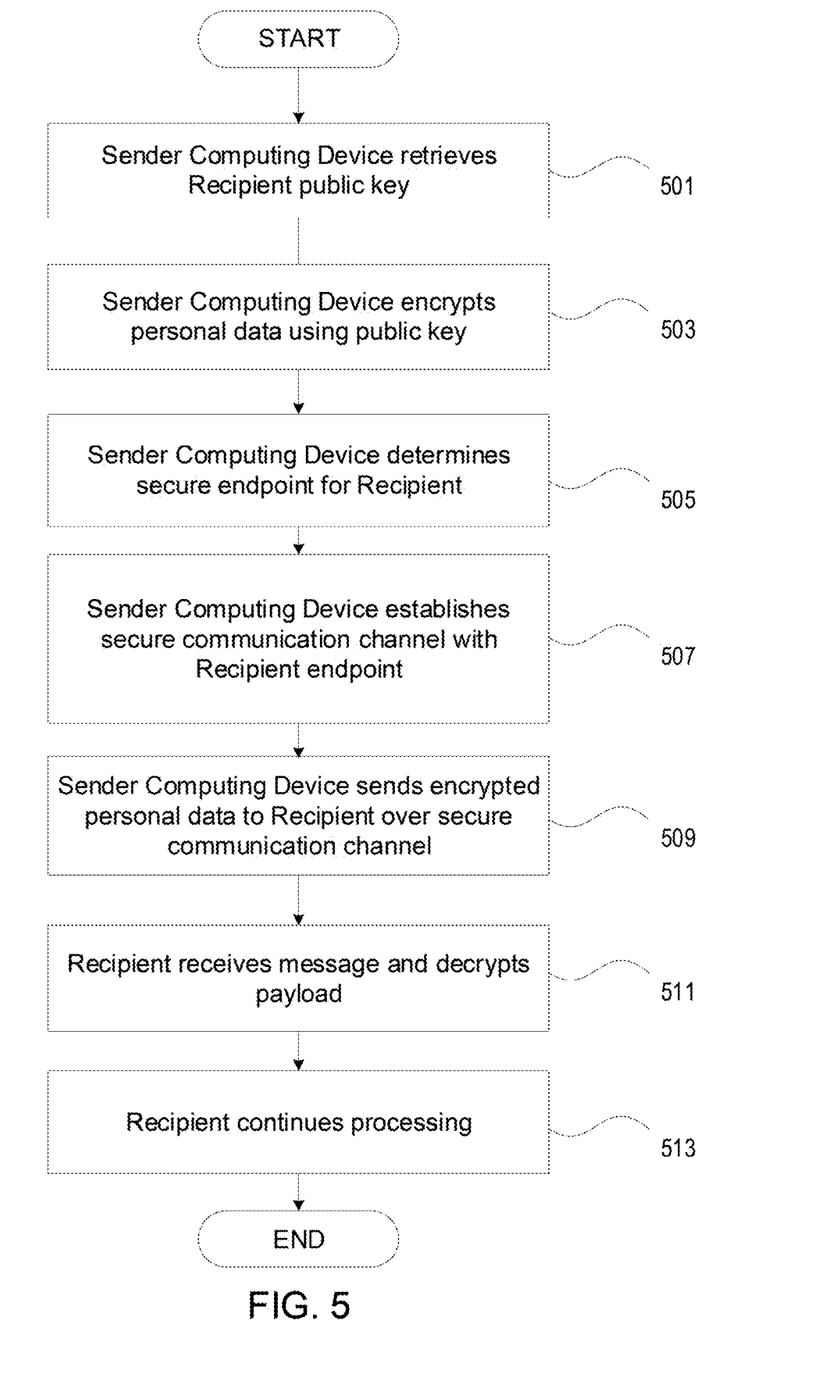
FIG. 5 is a flow chart depicting steps for sending personal information via a secure communication channel.

FIGS. 3-5 are more detailed algorithmic examples of various aspects discussed above with respect to FIG. 2A, FIG. 2B, and FIG. 2C. As with FIG. 2A, FIG. 2B, and FIG. 2C, a computing device may comprise one or more processors and memory storing instructions that, when executed by the one or more processors, cause the performance of one or more steps of any of FIGS. 3-5. Moreover, one or more non-transitory computer-readable media may store instructions that, when executed by one or more processors, cause a computing device to perform one or more of the steps of any of FIGS. 3-5.

FIG. 3 shows a method for registering an address with the Travel Rule authority device 204. More particularly, FIG. 3 is an example of how a proof message may be provided by the recipient 202 as part of step 205 of FIG. 2A.

The method described with respect to FIG. 3 may be performed via an API exposed by Travel Rule authority device 204 and through which a member VASP (e.g., the recipient 202) may interact as described herein. API authentication may be by any known authentication technique, e.g., OATH2 or the like. Member VASPs (e.g., the recipient 202) may be required to register and agree to various terms and conditions before being granted access to the Travel Rule authority device 204, its database, and/or its capabilities.

Once the recipient 202 has completed any necessary formalities to gain access to the Travel Rule authority device 204, in step 301, the recipient 202 may submit, to the Travel Rule authority device 204, a registration request for a particular blockchain address. The registration request may include the address itself or, in order to minimize even the amount of address information stored in the Travel Rule authority device 204 database, the registration request may instead include a hash of the particular address. For example, the registration request may include an identifier of the VASP and a hash of the address to be registered (e.g., using SHA256, SHA512, or the like).

Next, in step 303, the Travel Rule authority device 204 may generate a UUID (a/k/a GUID) to associate the recipient 202 with the particular registration (and, provisionally, the blockchain address), and returns the UUID to the registering VASP.

In step 305, the recipient 202 may create and sign a proof message (which may additionally and/or alternatively be referred to as a proof of custodianship message). The proof message may be generated as a string composed of variables such as an arbitrary prefix, the UUID, and the blockchain address. The proof message may be additionally and/or alternatively signed using the private key corresponding to the blockchain address (that is, the public key) being registered. For example, the format of the proof message may be {prefix} {UUID} {blockchain address}. In this manner, the proof message proves that the recipient 202 is associated with the blockchain address, as the recipient 202 is using a private key that corresponds to the wallet address (which is the public key of the public/private key pair). As such, the proof message may be signed with the private key of said pair, such that, when another entity decrypts the message using the wallet address as the public key, the message contents are revealed. The proof message may be represented as signed({prefix} {UUID} {blockchain address}, AddressPrivateKey). The prefix may be any prefix of the registering VASPs choosing. The prefix may be configured to avoid conflict with other transmissions involving the UUID and/or the blockchain address. For example, because a prefix such as "travelrule_" might be appended to the proof message to distinguish the proof message from other similar messages which may be transmitted over a network.

Lastly, in step 307, the registering VASP may submit the proof message to the Travel Rule authority device 204 for inclusion in the Travel Rule authority device 204's custodial proof database, which may be referenced by sending VASPs (e.g., the sender computing device 201) to validate that the recipient 202 is genuinely associated with the blockchain address in question. As the proof message may be signed using the private key corresponding to a blockchain address, sending VASPs (e.g., the sender computing device 201) may validate that the recipient 202 is genuinely associated with the blockchain address in question by decrypting all or portions of the proof message using the blockchain address (that is, the public key).

FIG. 4 depicts a method for the sender computing device 201 to confirm ownership of a blockchain address to which it is sending one or more virtual assets. FIG. 4 may correspond to all or portions of step 205e, step 205f, and step 205g of FIG. 2A. More particularly, FIG. 4 depicts the circumstance where, as described above with respect to FIG. 3, the recipient 202 has provided proof messages to the Travel Rule authority device 204.

In step 401, the sender computing device 201 may query the Travel Rule authority device 204 for the blockchain address to which the one or more virtual assets have been and/or will be sent. The query may include the actual blockchain address or, as with the registration process described above with respect to step 301 of FIG. 3, the query may instead include a hash of the address to minimize exposure of the actual address on the Internet.

In step 403, the Travel Rule authority device 204 may return the signed proof message to the sender computing device 201. This signed proof message may be the same or a similar message as described above with respect to step 305 and step 307 of FIG. 3.

In step 405, the sender computing device 201 may attempt to decrypt the proof message using a public key. The public key may be, e.g., the blockchain address to which the sender computing device 201 is attempting to send the virtual assets. By decrypting the message using the public key (e.g., the blockchain address corresponding to a receiving cryptocurrency wallet), the sender computing device 201 may confirm that the recipient 202 is genuinely associated with the blockchain address. As just one example of this process, decrypting the message may comprise determining a combination of one or more of: a prefix (e.g., the prefix discussed above with respect to step 305 of FIG. 3), a UUID corresponding to the blockchain address, and/or the blockchain address. In such an example, that combination might be compared to the decrypted message to ascertain whether the recipient 202 is genuinely associated with the blockchain address.

FIG. 5 depicts a method for the sender computing device 201 to securely transmit personal data (e.g., sensitive customer information, such as PII, that details information about an owner of the one or more virtual assets) to the recipient 202. As such, this step may correspond to activity by the sender computing device 201 after step 205g of FIG. 2A and, e.g., as part of step 205h and/or step 205i of FIG. 2A.

After the sender computing device 201 confirms that a blockchain address is custodied by the recipient 202 (e.g., using the method shown in FIG. 4 and/or as part of all or portions of step 205e, step 205f, and step 205g of FIG. 2A), then, in step 501, the sender computing device 201 may retrieve a public key corresponding to the recipient 202. That public key might be retrieved from a public repository, such as an online database or website. Such a public key may be a public key published by the VASP and part of a public/private key pair unique to that VASP. For example, as discussed above, VASPs may make available (e.g., in a central repository) a public key with which messages to a particular VASP may be encrypted. Other VASPs may use the public keys from these repositories to encrypt data (e.g., the personal data) to send to the VASP corresponding to the public key.

In step 503, the sender computing device 201 may use the public key associated with the recipient 202 to encrypt personal data to be sent with the recipient 202. The sender computing device 201 may, as part of using the key, verify the public key. For example, the sender computing device 201 may use one or more out-of-band APIs to verify the public key. Such out-of-band APIs might comprise, for example, a separate process for querying a database with the public key to ensure the validity of the public key.

In step 505, after encrypting the personal data in step 503, the sender computing device 201 may determine a secure endpoint via which to transmit the encrypted personal data to the recipient 202. Endpoint information for VASPs such as the recipient 202 may be maintained by the Travel Rule authority device 204, and/or may be based on an agreement by all VASP members to use a common third level domain verified with a predefined level and/or type of server certification.

In step 507, upon confirming the endpoint in step 505, the sender computing device 201 may establish a connection with the recipient 202 via the endpoint. During this step, the sender computing device 201 may verify that certificates associated with the recipient 202 (e.g., those used to facilitate the secure communication channel 206, such as those used for mTLS) are valid. For example, sender computing device 201 may verify that one or more certificates used to establish the secure communication channel 206 (and associated with the recipient 202) are valid. To check whether the one or more certificates are valid, the sender computing device 201 may query one or more certificate authorities for validation information corresponding to the one or more certificates. For example, the sender computing device 201 may send, to a certificate authority, one or more certificates associated with an mTLS session and receive, from the certificate authority, an indication as to whether the one or more certificates are valid.

In step 509, and after establishing the connection in step 507, the sender computing device 201 may send the encrypted personal data to the recipient 202. The sender computing device 201 may send the encrypted personal data to the recipient over a secure connection, such as mTLS.

In step 511, the recipient 202 may receive the encrypted personal data and decrypt the encrypted personal data with its private key. The private key may be unique to the recipient 202 and may correspond to a public key published by the recipient 202 in, e.g., a central repository. The private key used to decrypt the encrypted personal data may be the private key that corresponds to a public key made available to other entities (e.g., other VASPs) via, for example, an online website or database. For example, a VASP might generate a public/private key pair, then publicly publish (e.g., on a website) the public key such that entities (e.g., associated with the sender computing device 201) can use that public key to encrypt personally identifiable information and transmit that personally identifiable information via the secure communication channel 206. The VASP might then use the private key corresponding to that public key to decrypt the encrypted personally identifiable information.

In step 513, the recipient 202 may then then proceeds with its own internal handling of the data. For example, the recipient 202 may run screening processes or the like. The recipient 202 may then credit an applicable user's account (e.g., a virtual asset account, such as a cryptocurrency wallet) as warranted.

Based on the autonomous nature of the transactions, the use of APIs and secure endpoints, and the speed with which blockchains confirm transactions, the Travel Rule compliance portion can be completed in less time than it takes to confirm a single block on most blockchains, and thus Travel Rule compliance may be invisible to end-users.

Figure 6:
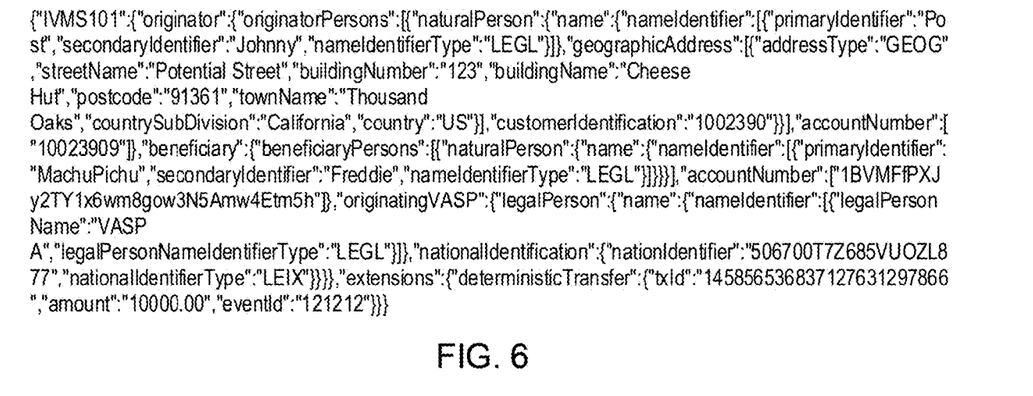
FIG. 6 is an illustrative JavaScript Object Notation (JSON) schema for personal data.

FIG. 6 is an illustrative JavaScript Object Notation (JSON) schema for personal data. The schema has been minified for the purposes of being readily included in FIG. 6. The schema depicted in FIG. 6 illustrates the sort of data (legal name, geographic address, beneficiary information, account number, the originating VASP) which might be included in the personal data sent to the recipient 202.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A sender computing device configured to participate in a confidential sharing of confidential personal data along with a transfer of virtual assets, the sender computing device comprising:
   one or more processors; and
   memory storing instructions that, when executed by one or more processors, cause the sender computing device to:
      send, to an authority device, a query comprising a blockchain address used, by the sender computing device and via a blockchain, to send one or more virtual assets to a recipient via the blockchain address,
         wherein the authority device is configured to store an association between the blockchain address and a proof message,
         wherein the proof message is signed with a private key associated with the blockchain address,
         wherein the proof message comprises the blockchain address and a data element corresponding to the blockchain address, and
         wherein the proof message was generated, by the recipient, and transmitted, by the recipient, to the authority device in response to receipt, by the recipient and from the authority device, of the data element;
      receive, from the authority device, the proof message; and
      based on decrypting the proof message using a public key associated with the blockchain address to confirm, based on the data element, that the recipient is associated with the blockchain address, send, to the recipient, personal data associated with an owner of the one or more virtual assets, wherein the personal data is encrypted, by the sender computing device, using a public key associated with the recipient.

2. The sender computing device of claim 1, wherein the authority device is configured to store the association between the blockchain address and the proof message in a probabilistic data structure.

3. The sender computing device of claim 2, wherein the probabilistic data structure comprises one or more of:
   a Bloom filter; or
   a Cuckoo filter.

4. The sender computing device of claim 1, wherein the authority device is configured to send the proof message based on a determination that a currency amount of the one or more virtual assets satisfies a regulatory threshold.

5. The sender computing device of claim 1, wherein the data element comprises a universally unique identifier (UUID).

6. The sender computing device of claim 1, wherein the personal data comprises one or more of:
   a legal name of the owner of the one or more virtual assets; or
   a physical address associated with the owner of the one or more virtual assets.

7. The sender computing device of claim 1, wherein the instructions, when executed by the one or more processors, further cause the sender computing device to:
   determine the public key associated with the recipient.

8. A method configured to facilitate a confidential sharing of confidential personal data along with a transfer of virtual assets, the method comprising:
   sending, by a sender computing device and to an authority device, a query comprising a blockchain address used, by the sender computing device and via a blockchain, to send one or more virtual assets to a recipient via the blockchain address,
      wherein the authority device is configured to store an association between the blockchain address and a proof message,
      wherein the proof message is signed with a private key associated with the blockchain address,
      wherein the proof message comprises the blockchain address and a data element corresponding to the blockchain address, and
      wherein the proof message was generated, by the recipient, and transmitted, by the recipient, to the authority device in response to receipt, by the recipient and from the authority device, of the data element;
   receiving, by the sender computing device and from the authority device, the proof message; and
   based on decrypting the proof message using a public key associated with the blockchain address to confirm, based on the data element, that the recipient is associated with the blockchain address, sending, by the sender computing device and to the recipient, personal data associated with an owner of the one or more virtual assets, wherein the personal data is encrypted, by the sender computing device, using a public key associated with the recipient.

9. The method of claim 8, wherein the authority device is configured to store the association between the blockchain address and the proof message in a probabilistic data structure.

10. The method of claim 9, wherein the probabilistic data structure comprises one or more of:
    a Bloom filter; or
    a Cuckoo filter.

11. The method of claim 8, wherein the authority device is configured to send the proof message based on a determination that a currency amount of the one or more virtual assets satisfies a regulatory threshold.

12. The method of claim 8, wherein the data element comprises a universally unique identifier (UUID).

13. The method of claim 8, wherein the personal data comprises one or more of:
    a legal name of the owner of the one or more virtual assets; or
    a physical address associated with the owner of the one or more virtual assets.

14. The method of claim 8, further comprising:
    determining, by the sender computing device, the public key associated with the recipient.

15. One or more non-transitory computer-readable media storing instructions configured to facilitate a confidential sharing of confidential personal data along with a transfer of virtual assets by causing a sender computing device to:
    send, to an authority device, a query comprising a blockchain address used, by the sender computing device and via a blockchain, to send one or more virtual assets to a recipient via the blockchain address,
       wherein the authority device is configured to store an association between the blockchain address and a proof message,
       wherein the proof message is signed with a private key associated with the blockchain address,
       wherein the proof message comprises the blockchain address and a data element corresponding to the blockchain address, and
       wherein the proof message was generated, by the recipient, and transmitted, by the recipient, to the authority device in response to receipt, by the recipient and from the authority device, of the data element;
    receive, from the authority device, the proof message; and
    based on decrypting the proof message using a public key associated with the blockchain address to confirm, based on the data element, that the recipient is associated with the blockchain address, send, to the recipient, personal data associated with an owner of the one or more virtual assets, wherein the personal data is encrypted, by the sender computing device, using a public key associated with the recipient.

16. The non-transitory computer-readable media of claim 15, wherein the authority device is configured to store the association between the blockchain address and the proof message in a probabilistic data structure.

17. The non-transitory computer-readable media of claim 16, wherein the probabilistic data structure comprises one or more of:
    a Bloom filter; or
    a Cuckoo filter.

18. The non-transitory computer-readable media of claim 15, wherein the authority device is configured to send the proof message based on a determination that a currency amount of the one or more virtual assets satisfies a regulatory threshold.

19. The non-transitory computer-readable media of claim 15, wherein the data element comprises a universally unique identifier (UUID).

20. The non-transitory computer-readable media of claim 15, wherein the personal data comprises one or more of:
    a legal name of the owner of the one or more virtual assets; or
    a physical address associated with the owner of the one or more virtual assets.

* * * * *